United States Patent
Luo et al.

(10) Patent No.: US 6,745,198 B1
(45) Date of Patent: Jun. 1, 2004

(54) PARALLEL SPATIAL JOIN INDEX

(75) Inventors: Gang Luo, Madison, WI (US); Curt J. Ellmann, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 250 days.

(21) Appl. No.: 09/878,569

(22) Filed: Jun. 11, 2001

(51) Int. Cl.$^7$ .............................................. G06F 17/30
(52) U.S. Cl. ...................................................... 707/102
(58) Field of Search ........................................ 707/102

(56) References Cited

U.S. PATENT DOCUMENTS

| | | | | | |
|---|---|---|---|---|---|
| 5,239,663 | A | * | 8/1993 | Faudemay et al. | 707/3 |
| 5,666,525 | A | * | 9/1997 | Ross | 707/2 |
| 5,884,320 | A | * | 3/1999 | Agrawal et al. | 707/104.1 |
| 5,978,794 | A | * | 11/1999 | Agrawal et al. | 707/3 |
| 5,987,468 | A | * | 11/1999 | Singh et al. | 707/100 |
| 6,014,614 | A | * | 1/2000 | Herring et al. | 702/196 |
| 6,032,144 | A | * | 2/2000 | Srivastava et al. | 707/3 |
| 6,141,655 | A | * | 10/2000 | Johnson et al. | 707/2 |
| 6,148,295 | A | * | 11/2000 | Megiddo et al. | 707/3 |
| 6,278,994 | B1 | * | 8/2001 | Fuh et al. | 707/4 |
| 6,353,826 | B1 | * | 3/2002 | Seputis | 707/5 |
| 6,496,819 | B1 | * | 12/2002 | Bello et al. | 707/3 |
| 6,618,720 | B1 | * | 9/2003 | On Au et al. | 707/2 |

OTHER PUBLICATIONS

L. Arge et al., "Scalable Sweeping–Based Spatial Join", VLDB 1998: 570–581.
N. Beckmann et al., "The R*–tree: An Efficient and Robust Access Method for Points and Rectangles", SIGMOD Conf. 1990, pp.. 322–331.
T. Brinkhoff et al., "Efficient Processing of Spatial Joins Using R–trees", SIGMOD Conf. 1993, pp. 237–246.
V. Gaede et al., "Multidimensional Access Methods", Computing Surveys 30(2), 1998, pp. 170–231.
G. Graefe, "Query Evaluation Techniques for Large Databases", ACM Comput. Surveys, 25(2):73–170, Jun. 1993.
A. Guttman, "R–Trees: A Dynamic Index Structure for Spatial Searching", SIGMOD Conf. 1984, pp. 47–57.
P. Haas et al., "Join Algorithms for Online Aggregation", IBM Research Report RJ10126, 1998.
P. Haas, "Techniques for Online Exploration of Large Object–Relational Datasets", Proc. 11$^{th}$ Intl. Conf. Scientific and Statistical Database Management, 1999, pp. 4–12.
P. Haas et al., "Ripple Joins for Online Aggregation", SIGMOD Conf. 1999, pp. 287–298.
I. Kamel et al., "Parallel R–trees", SIGMOD Conf. 1992, pp. 195–204.
J. Nievergelt et al., "The Grid File: An Adaptable, Symmetric Multikey File Structure", TODS 9(1): 38–71, 1984.
J. Patel et al., "Building a Scalable Geo–Spatial DBMS: Technology, Implementation, and Evaluation", SIGMOD Conf. 1997, pp. 336–347.
J. Patel et al., "Clone Join and Shadow Join: Two Parallel Algorithms for Executing Spatial Join Operations", Technical Report, University of Wisconsin, CS–TR–99–1403, Aug. 1999.
J. Patel et al., "Partition Based Spatial–Merge Join", SIGMOD Conf. 1996, 259–270.
D. Rotem, "Spatial Join Indices", ICDE 1991,, pp. 500–509.
M. Stonebraker et al., "The Sequoia 2000 Storage Benchmark", SIGMOD Conf. 1993, pp. 632–645.
P. Valduriez, "Join Indices", TODS 12(2): 218–246, 1987.

* cited by examiner

*Primary Examiner*—Wayne Amsbury
(74) *Attorney, Agent, or Firm*—Trop, Pruner, & Hu P.C.; John D. Cowart

(57) ABSTRACT

A parallel spatial join index is used for efficient join operations involving spatial data, including polygon data. The join operations between spatial data from two different tables are performed in parallel in a multi-processor environment. Join indices are created, based upon spatial object attributes from the two tables. Auxiliary relations are constructed from the two tables as well, and further include data for avoiding duplicate join results. R-trees index the auxiliary relations and B-trees index the join indices.

28 Claims, 12 Drawing Sheets

FIG. 4

TABLE A: — 12a

| a_id | a | b | c | d | e |
|------|---|---|---|---|---|
|      |   |   |   |   |   |
|      |   |   |   |   |   |
|      |   |   |   |   |   |
|      |   |   |   |   |   |
| ⋮ | | | | | |
|      |   |   |   |   |   |
|      |   |   |   |   |   |

TABLE B: — 12b

| b_id | u | v | w | x | y | z |
|------|---|---|---|---|---|---|
|      |   |   |   |   |   |   |
|      |   |   |   |   |   |   |
|      |   |   |   |   |   |   |
|      |   |   |   |   |   |   |
| ⋮ | | | | | | |
|      |   |   |   |   |   |   |
|      |   |   |   |   |   |   |

FIG. 6

AUXILIARY RELATION AR_A:

| a_id | a_BMP | a | b | c | d | e |
|---|---|---|---|---|---|---|
| | | | | | | |
| | | | | | | |
| | | | | | | |
| | | | | | | |
| ⋮ | | | | | | |
| | | | | | | |
| | | | | | | |

32a / 34a

AUXILIARY RELATION AR_B:

| b_id | b_BMP | u | v | w | x | y | z |
|---|---|---|---|---|---|---|---|
| | | | | | | | |
| | | | | | | | |
| | | | | | | | |
| | | | | | | | |
| | | | | | | | |
| ⋮ | | | | | | | |
| | | | | | | | |
| | | | | | | | |

32b / 34b

PARALLEL SPATIAL JOIN INDEX

BACKGROUND

Databases are ubiquitous. As information is accumulated, a database inevitably emerges, both to maintain and to access the information. The vast stores of information upon which many organizations depend have, in many instances, grown unwieldy. Tools for accessing the data continue to be developed at a rapid rate.

With such demands driving the industry, the optimization of query operations is an ongoing feature of database software development. Take, for example, the plethora of types of indexing methods. Indices provide a mechanism for finding a row (also known as a tuple) of a table (also known as a relation) from possibly millions of rows. Hash indices and B-trees are two common indexing types. More recently, with the availability of spatial objects in databases, R-trees and R*-trees, are used for efficient access to the objects.

Another index, known as a join index, is a type of "precomputed" join operation between two or more tables of data. A join index is a data structure that tries to store enough information to accelerate join operations between tables of data. In practice, a join index is a distinct table including record identifiers from two or more existing tables. To compute a join, the record identifiers in the join index are sorted for efficient fetching of tuples from the tables.

Increasingly, spatial data types form part of the database data. Spatial join indices have been proposed to aid efficient spatial join formation. For example, these spatial join indices may employ a grid file, which is a point data index structure, to index the spatial join attributes. Unfortunately, the grid file limits the spatial join index to only point data rather than polygon data. Furthermore, the original spatial join index may only be used in a uni-processor environment. Thus, the known spatial join indices are unsuitable for applications such as data warehousing where parallelism is crucial for optimal performance.

SUMMARY

In accordance with the embodiments described herein, a method is disclosed in which a portion of a join index is received into a memory. The join index comprises first record identifiers from a first table and second record identifiers from a second table. In memory, the join index is sorted according to first record identifiers from the first table. The portion of the join index is resorted according to second record identifiers from the second table. Join operations are performed between first and second spatial join attributes using the resorted portion of the join index.

Other features and embodiments will become apparent from the following description, from the drawings, and from the claims.

BRIEF DESCRIPTION OF THE DRAWINGS

FIG. 4 is a diagram of two tables according to one embodiment of the invention;

FIG. 6 is a diagram of two auxiliary relations according to one embodiment of the invention;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with the following embodiments, a parallel spatial join index may be used with spatial data in a parallel multi-processor environment. The spatial data is not limited to point data, but may include a variety of spatial objects, such as polygons.

In one embodiment, a parallel spatial join index is used in spatial data warehousing. Suppose, for example, there are two tables in the database, "forest" and "rainfall." The "forest" table represents the forests in the world and includes a spatial object attribute, such as polygon data, that depicts physical features of the various forests. The "rainfall" table indicates the rainfall levels at different locations in the world. It also includes a spatial object attribute. Suppose the data of the two tables are collected from several sites all over the world, from time to time, as the climate is always changing and deforestation is taking place.

A query such as "find all forests in the world that receive more than ten inches of average rainfall per year" involves a spatial join operation. The spatial objects in the "forest" table are compared with the spatial objects in the "rainfall" table to obtain results that meet the query criteria.

In some instances, pre-computing the spatial join between these two tables as a spatial join index may improve the efficiency of the query operation. Such may be the case, for example, where the spatial objects are to be compared frequently. A join index based on other non-spatial attributes of the "forests" and "rainfall" tables may likewise be generated.

Whether spatial or otherwise, each join index occupies a portion of disk space. Thus, judicious analysis of the types of query operations being performed typically influences the number and type of join indices that are maintained.

Figure 1:
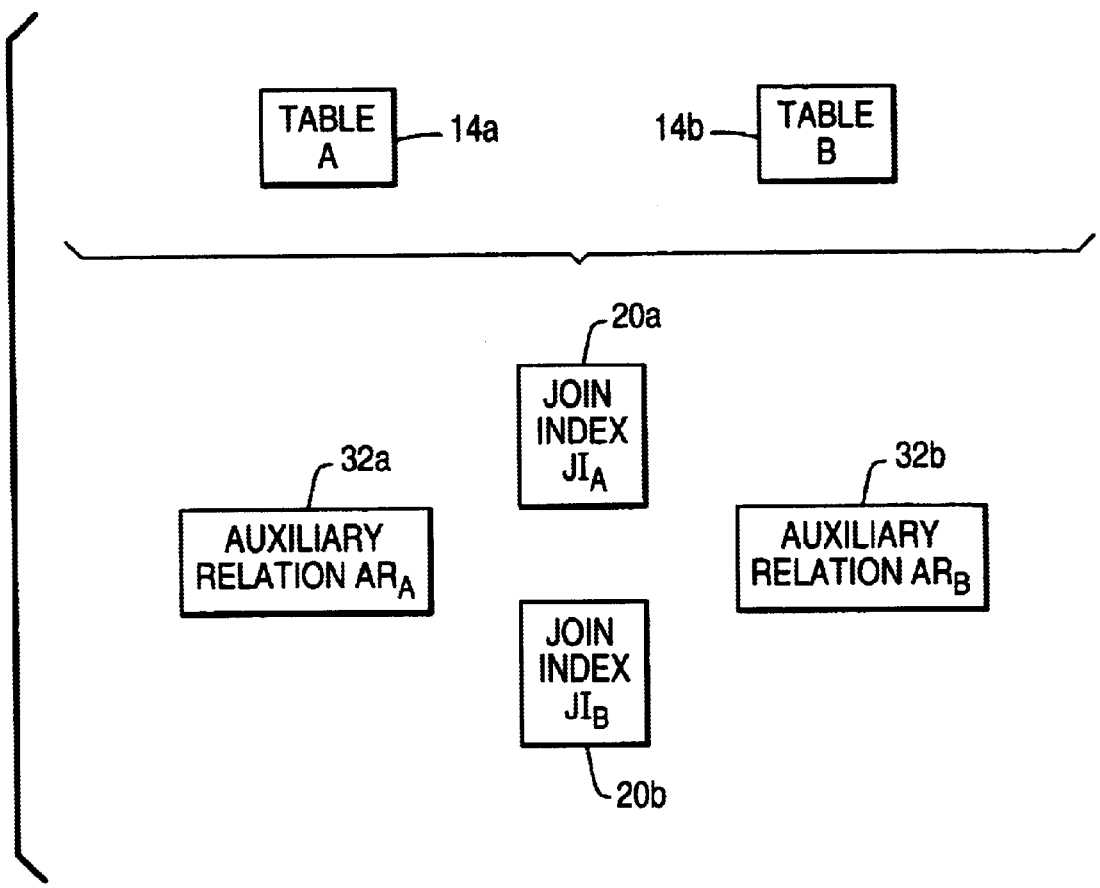
FIG. 1 is a block diagram of a representation of two tables according to one embodiment of the invention.

FIG. 1 illustrates a data structure for performing the spatial join index operation, according to one embodiment. Tables A and B (14) are two tables, also known as relations, of data. In one embodiment, the tables 14 include spatial object attributes. It is from the rows (also known as tuples) of these tables that the spatial join operations are to be performed.

From the tables A and B, auxiliary relations $AR_A$ and $AR_B$ 32 are generated. As described further below, these auxiliary relations reorganize the data from the tables with the spatial object attributes in mind. Further, two join indices 20 are generated from the auxiliary relations 32. These join indices 20 contain no spatial object data, but, instead, include identifiers of the tuples. As useful data structures, the join indices 20 provide efficient access to the auxiliary relations 32 when performing join operations.

In one embodiment, auxiliary relations $AR_A$ and $AR_B$ (instead of tables A and B), as well as join indices $JI_A$ and $JI_B$, are used to perform the spatial join operation between tables A and B. The operation is described in more detail, below.

Operating Environment

Figure 2:
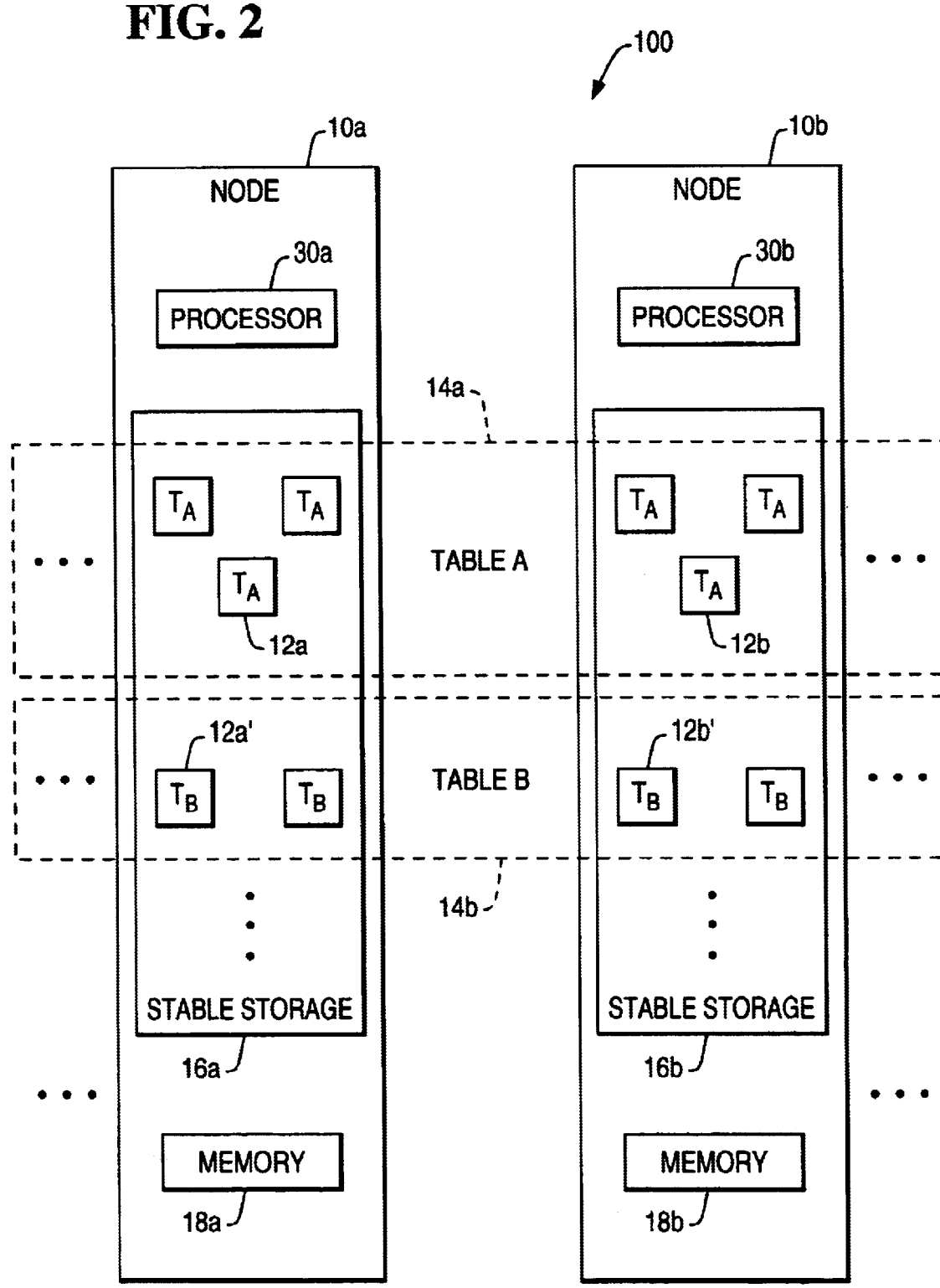
FIG. 2 is a block diagram of a multi-processor parallel database according to one embodiment of the invention.

In one embodiment, the parallel spatial join index operates in a parallel object-relational database management system (ORDBMS) with L data server nodes (L being greater than one). In FIG. 2, a parallel ORDBMS 100, according to one example, includes a plurality of nodes 10. Two nodes 10a and 10b of the plurality of nodes 10 are depicted. Each node 10 includes a processor 30, for executing application programs, such as database management software, a memory 18, and a stable storage 16, such as a hard disk drive or other non-volatile medium. A software program 300 is executable by the processor 30, and may perform the spatial join operations, as described in FIG. 12, below.

As shown in FIG. 2, tuples 12, also known as rows, of tables A and B are distributed across multiple nodes 10 in the system 100. For example, tuples 12a of table A ($T_A$) are found on one node 10a, while tuples 12b of table A are found on another node 10b. Tuples $T_A$ may include spatial attributes.

Likewise, a second table 14b, called table B, includes tuples 12' ($T_B$), also distributed on multiple nodes 10. One set of tuples 12a' of table B are on one node 10a while tuples 12b' of table B are on another node 10b. Tuples $T_B$ may include spatial attributes.

Both tables 14 may include additional tuples 12, distributed to additional nodes 10 of the parallel ORDBMS 100. In one embodiment, the tuples 12 of each table 14 are distributed, as evenly as possible, across all the nodes 10 of the parallel ORDBMS 100. In one embodiment, the tuples 12 for each node 10 are located in the stable storage 16. During a join or other query processing operation, the tuples 12 may be fetched to the memory 18.

Figure 3:
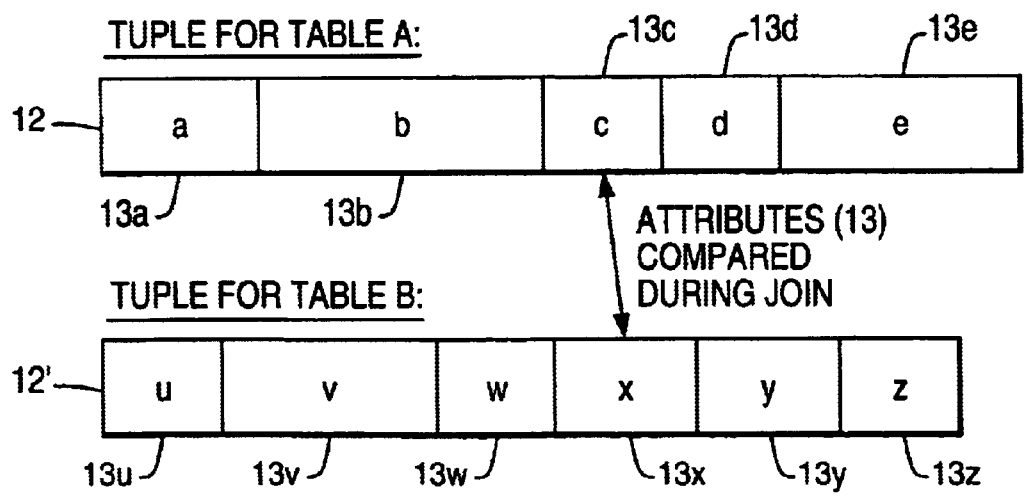
FIG. 3 is a diagram of tuples including attributes for two tables according to one embodiment of the invention.

The tuples 12 for tables A and B are illustrated in FIG. 3, according to one example. The tuple 12 for table A ($T_A$) includes several attributes, or columns, 13, denoted a, b, c, d, and e. Attribute "d" of table A is denoted A.d. The tuple 12' for table B ($T_B$) includes similar attributes 13, denoted u, v, w, x, y, and z. One or more of these attributes 13 may comprise spatial object data. Alternatively, the attributes 13 may comprise pointers to spatial object data, where the actual spatial objects are stored elsewhere on the node 10.

In one example, attribute "c" of table A, denoted A.c, is a spatial object attribute. Likewise, attribute "x" of table B, or B.x, is a spatial object attribute. The spatial join operation between attributes A.c and B.x is performed using the auxiliary relations $AR_A$ and $AR_B$ as well as the join indices $JI_A$ and $JI_B$.

Figure 4:
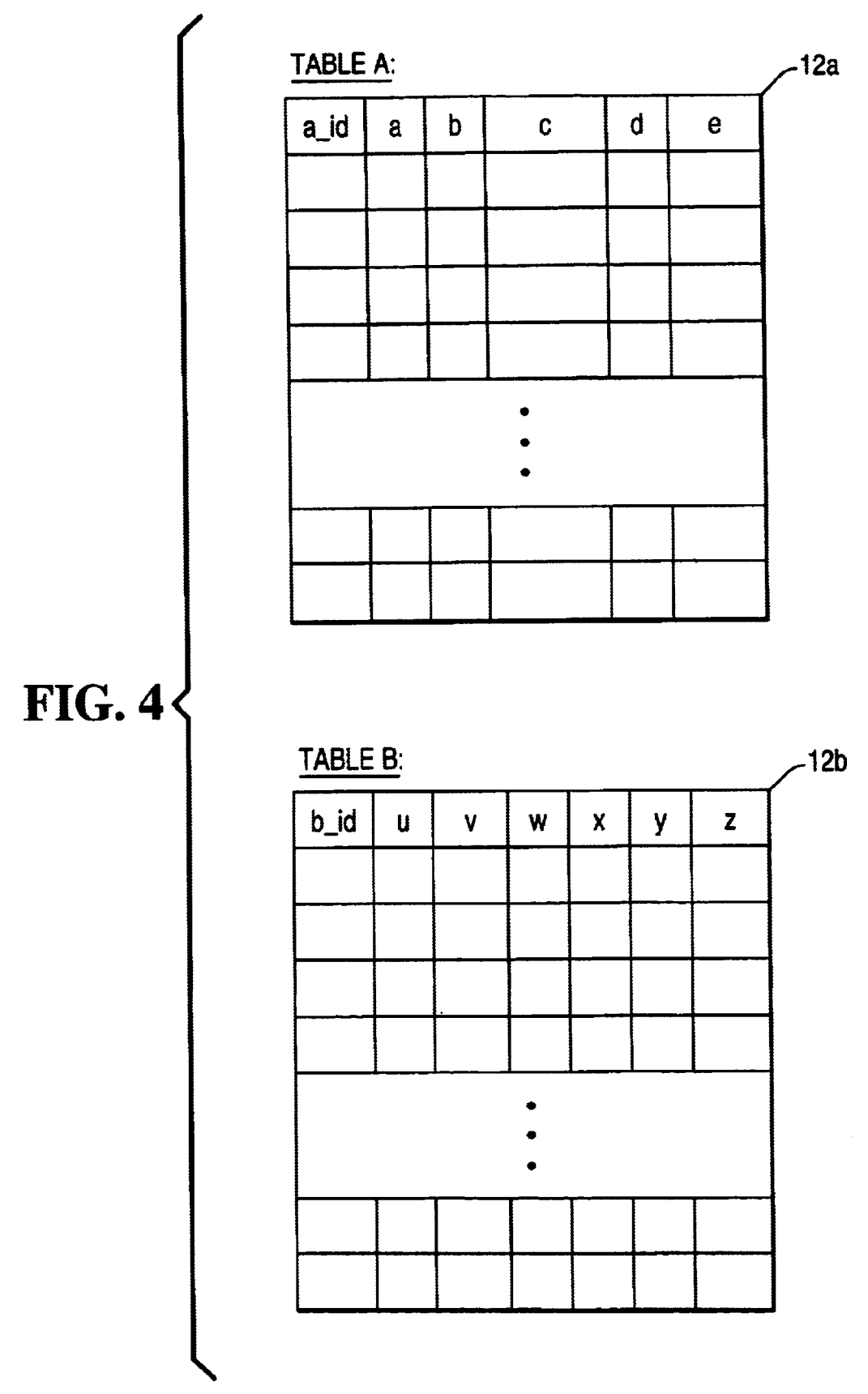

In FIG. 4, tables A and B are illustrated. As in FIG. 3, tuples $T_A$ of table A include attributes a, b, c, d, and e. Tuples $T_B$ of table B include attributes u, v, w, x, y, and z. Additionally, according to one embodiment, each tuple 12 of each table 14 is uniquely identified by a system generated identifier that never changes, known as a record identifier. The record identifier may, for example, be generated by performing a hash function on the primary index of the table. For table A, the record identifier is denoted by a_id. For table B, the record identifier is likewise denoted by b_id.

While some strategy is involved with how the tuples 12 are distributed to the various nodes 10 of the system 100, the strategy did not likely involve the spatial attributes A.c and B.x of the tables 14. Thus, according to one embodiment, a spatial partitioning function (SPF) 40 (FIG. 5A) is used to reorganize the data from tables A and B as auxiliary relations $AR_A$ and $AR_B$, respectively, according to the spatial attributes A.c and B.x.

In one embodiment, a universe is defined as a minimum rectangle such that for any tuple T of the two join tables A and B, the spatial join attribute value of the tuple is contained within the rectangle. Thus, in the example involving tables "forests" and "rainfall," the universe would be the entire world. Alternatively, the universe may be more limited, such as encompassing the boundaries of a territory.

In one embodiment, the SPF 40 decomposes the universe comprising spatial objects into L subparts. Each subpart corresponds to a data server node 10. The SPF determines which nodes 10 of the system 100 are to be associated with which tuples $T_A$ and $T_B$, based on the spatial attributes A.c and B.x. A given tuple $T_A$ ($T_B$) may be associated with more than one node 10, due to the overlapping nature of the spatial attributes.

Figure 5A:
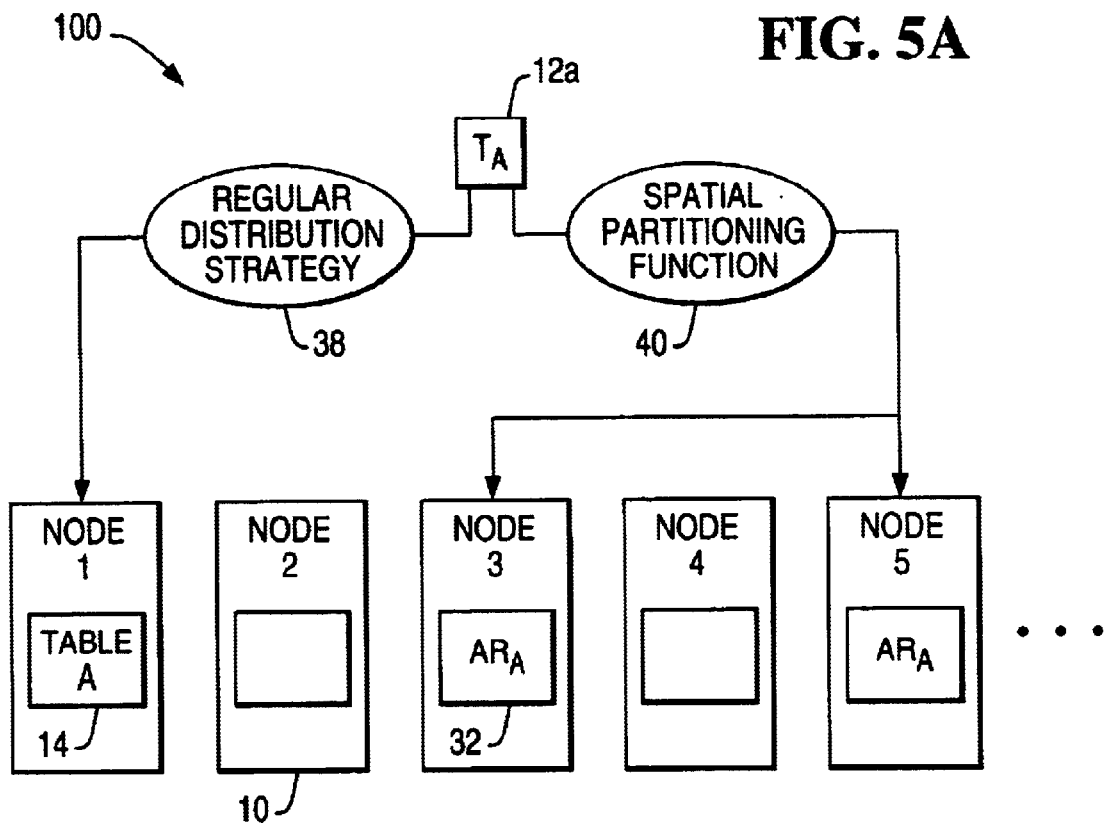
FIGS. 5A and 5B illustrate how the join index is produced according to one embodiment of the invention.

The associations are reflected in the auxiliary relations $AR_A$ and $AR_B$, according to one embodiment. In FIG. 5A, for example, $T_A$ is distributed to one of a plurality of nodes 10 according to a regular distribution strategy 38. The distribution strategy 38 may be based on an attribute of the tuple $T_A$, for example. In FIG. 5A, tuple $T_A$ is distributed to table A at node 1.

Additionally, the tuple $T_A$ is distributed to the auxiliary relation $AR_A$ according to the spatial partitioning function (SPF) 40. In FIG. 5A, for example, tuple $T_A$ is distributed to the auxiliary relation $AR_A$ for both nodes 3 and 5. Recall that tables A and B as well as relations $AR_A$ and $AR_B$, are distributed across all the nodes 10 of the ORDBMS 100. Thus, in addition to $T_A$ being stored at node 1, two additional copies of $T_A$ are stored, one copy at node 3 and a second copy at node 5.

Once the tuple $T_A$ is stored in the auxiliary relation $AR_A$, at each node where the tuple is stored, the join index $JI_A$ ($JI_B$) is also updated, according to one embodiment. In FIG. 5A, the join index $JI_A$ ($JI_B$) would be updated at nodes 3 and 5, for example. Based on a spatial join condition (SJC) 36, tuple $T_A$ in auxiliary relation $AR_A$ is compared to one or more tuples $T_B$ in auxiliary relation $AR_B$. Where the spatial join condition 36 is met, the tuple $T_A$ is joined with the selected tuples $T_B$.

Figure 5B:
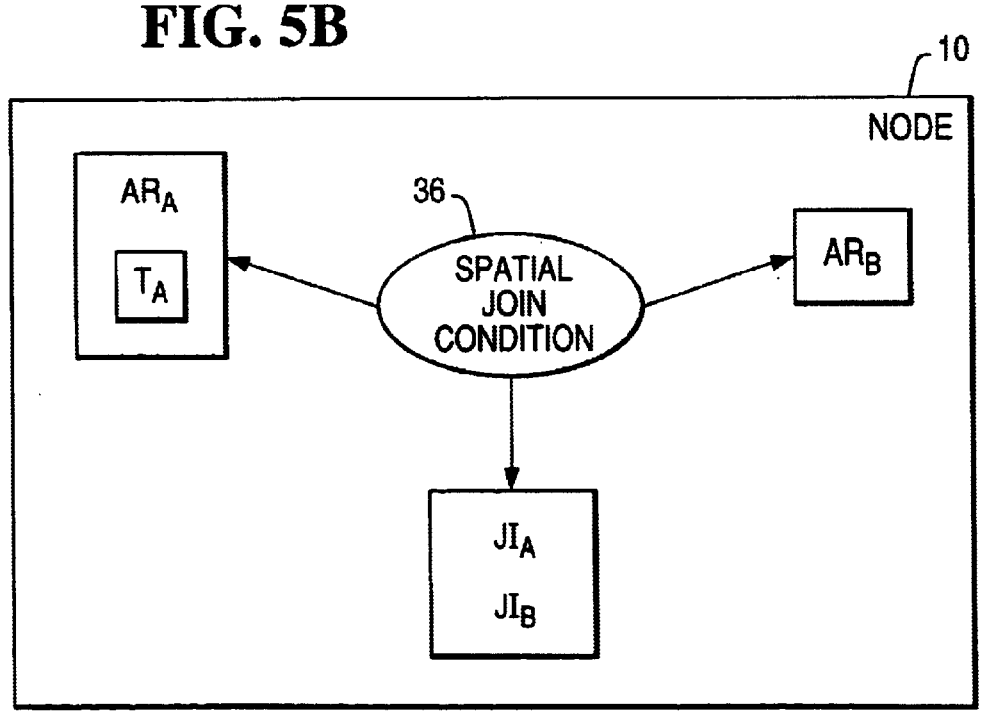

Likewise, the join index $JI_A$ ($JI_B$) is updated to reflect the joined pairs, using the record identifiers, a_id and b_id. If tuple $T_A$ was combined with five tuples $T_B$, for example, the join index $JI_A$ ($JI_B$) would include five new sets of (a_id, b_id) pairs, each with the same a_id. In FIGS. 5A and 5B, tuples $T_A$ are received by the ORDBMS 100. Analogous operations are performed when tuples $T_B$ are received.

By maintaining the join indices $JI_A$ and $JI_B$ when tuples are received, subsequent query operations may utilize the join indices $JI_A$ and $JI_B$, rather than tables A and B, to perform spatial join operations. The join indices $JI_A$ and $JI_B$ essentially indicate all the pairings of tuples that have met the spatial join condition 36 and thus, enable efficient spatial join operations to be performed. Further, the join indices are maintained at each node 10 and include record identifiers for tuples stored in auxiliary relations at the same node. As depicted in FIG. 1, tables A and B are essentially replaced by auxiliary relations $AR_A$ and $AR_B$, as well as join indices $JI_A$ and $JI_B$, for purposes of performing spatial join operations.

Unlike some implementations for performing spatial join operations between tuples of two tables, the tuples $T_A$ and $T_B$ are not redistributed to the nodes 10 according to their respective spatial object attributes A.c and B.x. Instead, the auxiliary relations $AR_A$ and $AR_B$ are constructed based on a possible redistribution or reorganization of the tuples $T_A$ and $T_B$, in which the spatial object attributes influence the construction. The tuples $T_A$ and $T_B$ continue to be distributed to tables A and B, respectively, according to a predetermined distribution strategy.

The auxiliary relations $AR_A$ and $AR_B$ may thus reflect a "virtual" redistribution of the tuples. The tuples are not actually redistributed at all, but remain in tables A and B where they were originally stored according to the predetermined distribution strategy. However, since copies of the tuples are made based on the spatial partitioning function 40 and stored at possibly different nodes from where originally stored, the tuples seem to have been redistributed. Thus, the tuples in $AR_A$ and $AR_B$, as distinct from those in tables A and B, are described as "virtually" redistributed.

Auxiliary relations $AR_A$ and $AR_B$ thus include all the tuples of $T_A$ and $T_B$ in which the tuples are simply rearranged. Additionally, however, according to one embodiment, each tuple $T_A$ of auxiliary relation $AR_A$ includes a bitmap attribute a_BMP. Likewise, each tuple $T_B$ of auxiliary relation $AR_B$ includes a bitmap attribute b_BMP. Bitmaps a_BMP and b_BMP are fixed-length bitmaps indicating to which nodes 10 tuples $T_A$ and $T_B$, respectively, would be inserted if redistribution of the tuples occurred based on the spatial object attributes.

Auxiliary relations 32 are depicted in FIG. 6, according to one embodiment. Auxiliary relation $AR_A$ 32a includes attributes a, b, c, d, and e, just as in table A 12a, as well as a bitmap attribute a_BMP. Likewise, auxiliary relation $AR_B$ 32b includes attributes u, v, w, x, y, and z, just as in table B 12b, as well as a bitmap attribute b_BMP.

For each tuple $T_A$ ($T_B$), bitmap a_BMP (b_BMP) keeps track of the "virtual" redistribution of the tuples $T_A$ ($T_B$), as reflected in auxiliary relation $AR_A$ ($AR_B$). Bitmap a_BMP (b_BMP) denotes all nodes 10 where the tuple $T_A$ ($T_B$) would be redistributed, based upon the spatial object attribute A.c (B.x). The size of a_BMP and b_BMP is equal to the number of nodes 10 in the system 100, one bit for each node, in one embodiment.

By using the bitmaps 34 to keep track of the nodes 10 upon which the tuples 12 would be distributed based upon the spatial object attributes, the generation of duplicate join results may be avoided. For each pair of tuples $T_A$ and $T_B$, the bitmaps a_BMP and b_BMP are consulted first to decide upon a single node 10 at which to perform a particular join operation.

Logical View

Using the tables 12 of FIG. 4, a join operation may be performed on spatial attributes from each table. For example, consider the join of tables A and B on the spatial attributes A.c and B.x, as in the following query:

SELECT* FROM A, B WHERE A.c SJC B.x;

where SJC is the desired spatial join condition to be performed. For example, the spatial join condition may be an "overlapping" function, a "contained in" function, or a "contains" function.

In one embodiment, the parallel spatial join index, JI, on tables A and B is the set:

$$JI=\{(a\_id, b\_id)|f(T_A.c, T_B.x)=\text{true}\}$$

where f is a Boolean function that represents the spatial join condition SJC, a_id identifies a tuple $T_A$ of A, b_id identifies a tuple $T_B$ of table B. One or more join indices JI may be constructed, based upon tables A and B.

In one embodiment, auxiliary relation $AR_A$ ($AR_B$) is clustered on a_id (b_id). Some data structures may be maintained to associate the record identifiers with page addresses of the auxiliary relations. In another embodiment, two join indices, $JI_A$ and $JI_B$, are constructed.

Figure 7:
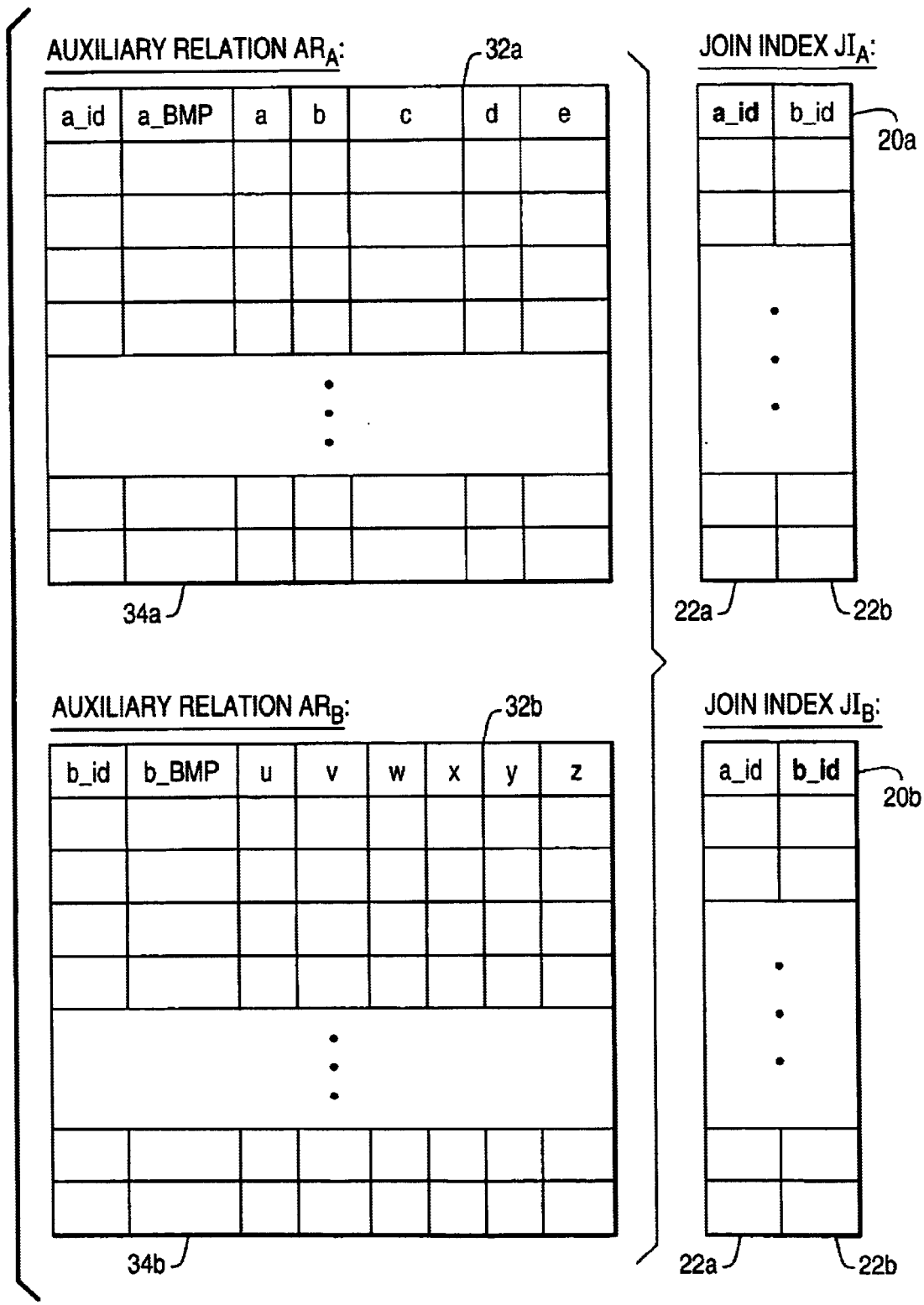
FIG. 7 is a diagram illustrating creation of two join indices from the two auxiliary relations of FIG. 6, according to one embodiment of the invention.

FIG. 7 illustrates join indices $JI_A$ and $JI_B$, according to one embodiment. A join index 20 is constructed from the record identifiers (of auxiliary relations $AR_A$ and $AR_B$). Record identifiers a_id populate a first column 22a while record identifiers b_id populate a second column 22b of each join index 20. As with auxiliary relation $AR_A$, join index $JI_A$ is sorted according to a_id. Likewise, as with auxiliary relation $AR_B$, join index $JI_B$ is sorted according to b_id.

In one embodiment, an R-tree index $RT_A$ on spatial object attribute c of table A (A.c) is maintained for auxiliary relation $AR_A$. Likewise, an R-tree index $RT_B$ is maintained on attribute x of table B for auxiliary relation B, $AR_B$. An R-tree is a type of index used for spatial data. R-trees index spatial data using minimum bounding rectangles (MBRs). Depending on how the MBRs for different spatial objects overlap, the objects are related to one another in the R-tree.

Figure 8:
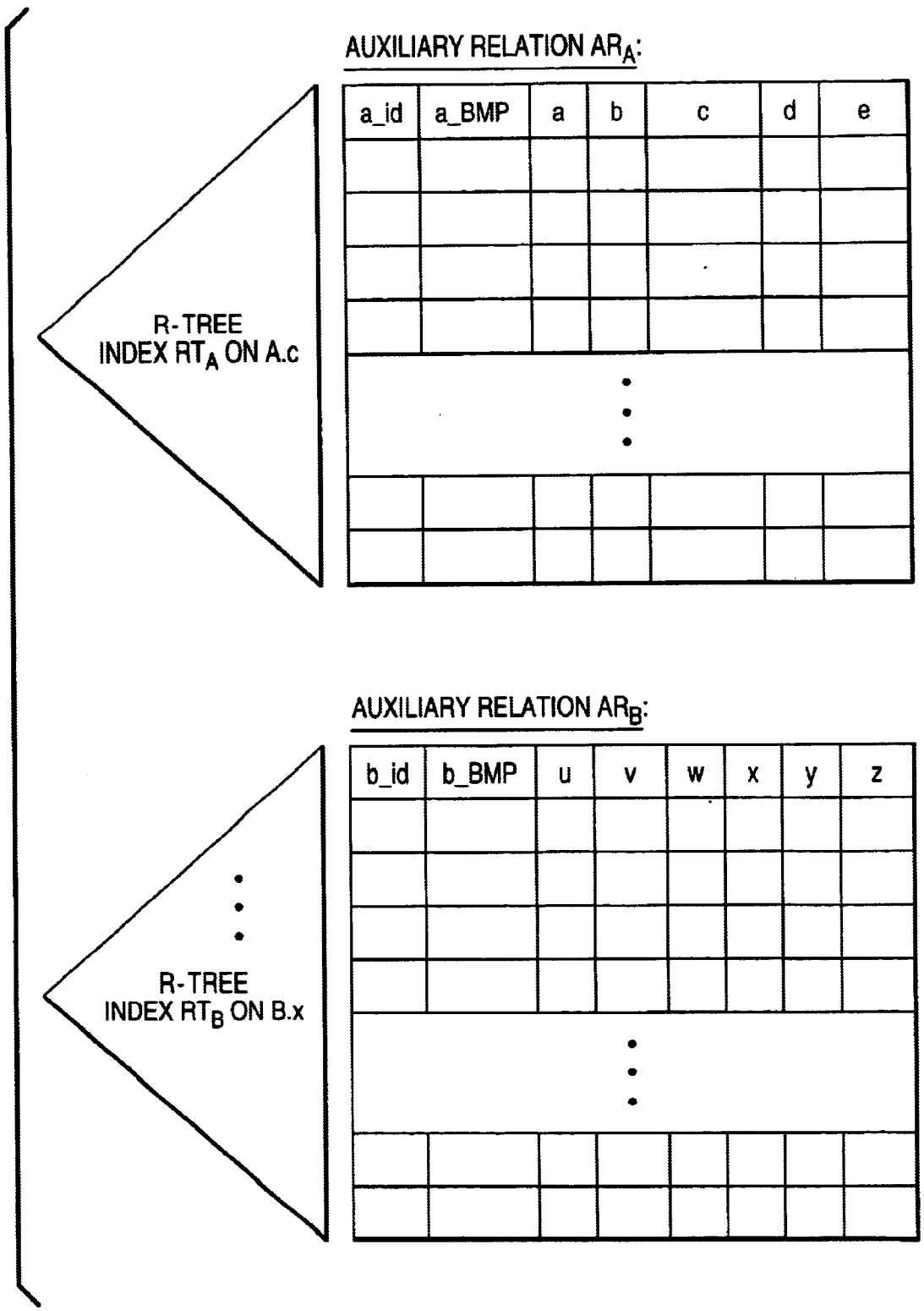
FIG. 8 is a diagram illustrating the two auxiliary relations indexed by R-trees according to one embodiment of the invention.

The R-tree indices $RT_A$ and $RT_B$, for auxiliary relations $AR_A$ and $AR_B$, respectively, are illustrated in FIG. 8, according to one embodiment. The R-tree indices are depicted as triangles adjacent to the respective auxiliary relations. The R-tree indices $RT_A$ and $RT_B$ facilitate efficient searching of auxiliary relations $AR_A$ and $AR_B$, for the spatial attributes c and x, respectively.

Figure 9:
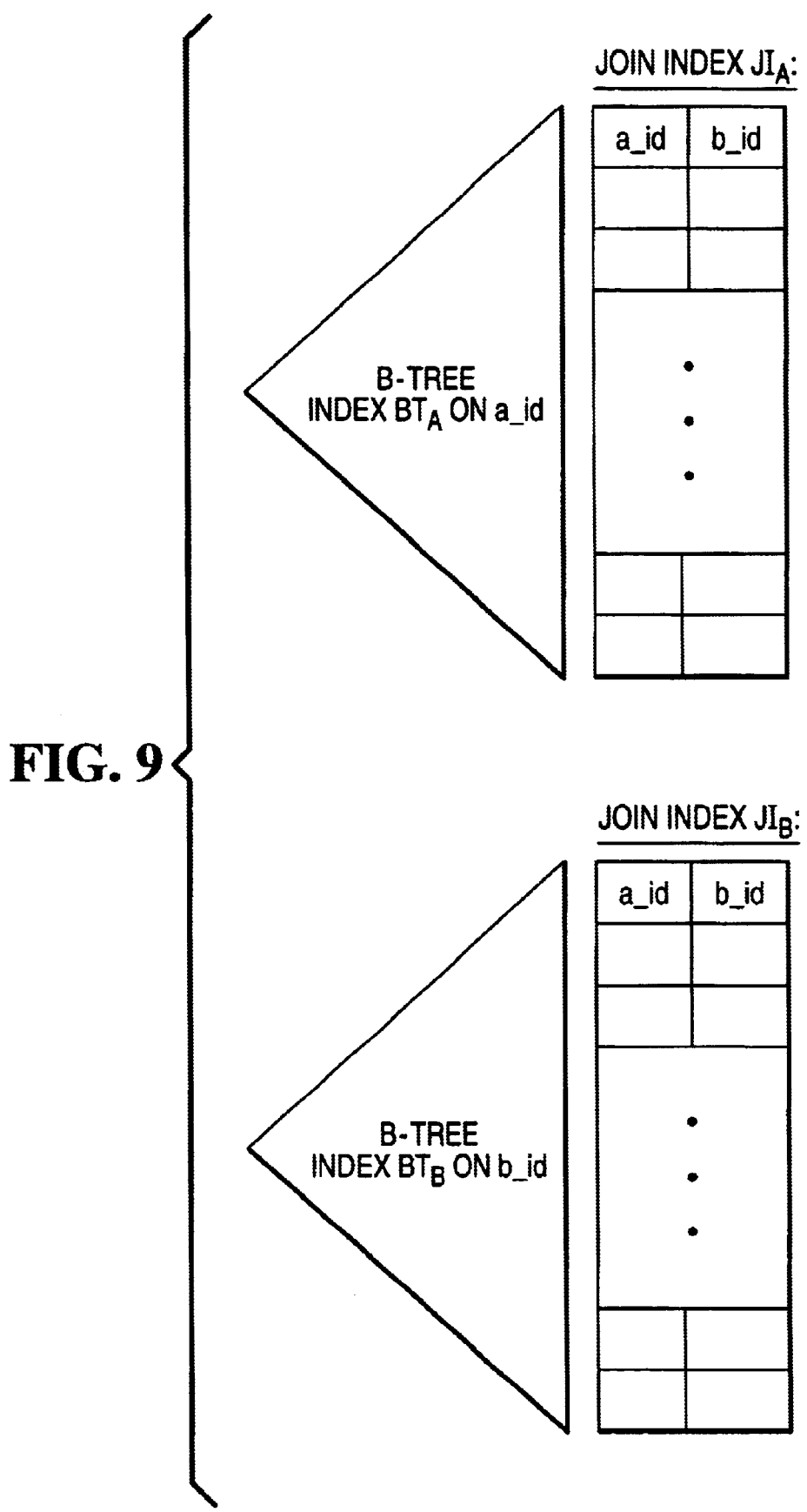
FIG. 9 is a diagram of join indices themselves indexed by B-trees according to one embodiment of the invention.

Likewise, join indices $JI_A$ and $JI_B$ are indexed, as depicted in FIG. 9, according to one embodiment. The join indices do not include spatial data, but record identifiers, a_id and b_id. Accordingly, in one embodiment, a B-tree is used to index the join indices. A B-tree is a data structure used for improving the speed of access to entries in a table. The B-tree organizes elements of the tables in a tree-like configuration. In a second embodiment, a $B^+$-tree, a specialized type of B-tree, is used to index the join indices. Designers of ordinary skill will recognize that B- and $B^+$-trees are but two of many possible data structures that may be used to index the entries in join indices $JI_A$ and $JI_B$.

In one embodiment, two copies of the join index, $JI_A$ and $JI_B$, are maintained. The first join index, $JI_A$, is indexed according to the record identifier a_id (of auxiliary relation $AR_A$). The second join index, $JI_B$, is indexed according to the record identifier b_id (of auxiliary relation $AR_B$). In one embodiment, a B-tree index $BT_A$ is used to index join index $JI_A$, while another B-tree index $BT_B$ is used to index join index $JI_B$.

Thus, from the tables A and B in FIG. 1, four tables, two auxiliary relations $AR_A$ and $AR_B$, and two join indices, $JI_A$ and $JI_B$, are maintained for performing efficient spatial join operations. The latter data structures, rather than the original tables A and B, facilitate the efficient execution of join operations involving spatial data.

While tuples $T_A$ of table A and tuples $T_B$ of table B are "virtually" present in more than one node 10, according to the auxiliary relations $AR_A$ and $AR_B$, a selection of one of the nodes is made when performing the spatial join operation. This keeps the system 100 from having to remove duplicate join results. The selected node is determined using the bitmaps a_BMP and b_BMP.

Figure 10:
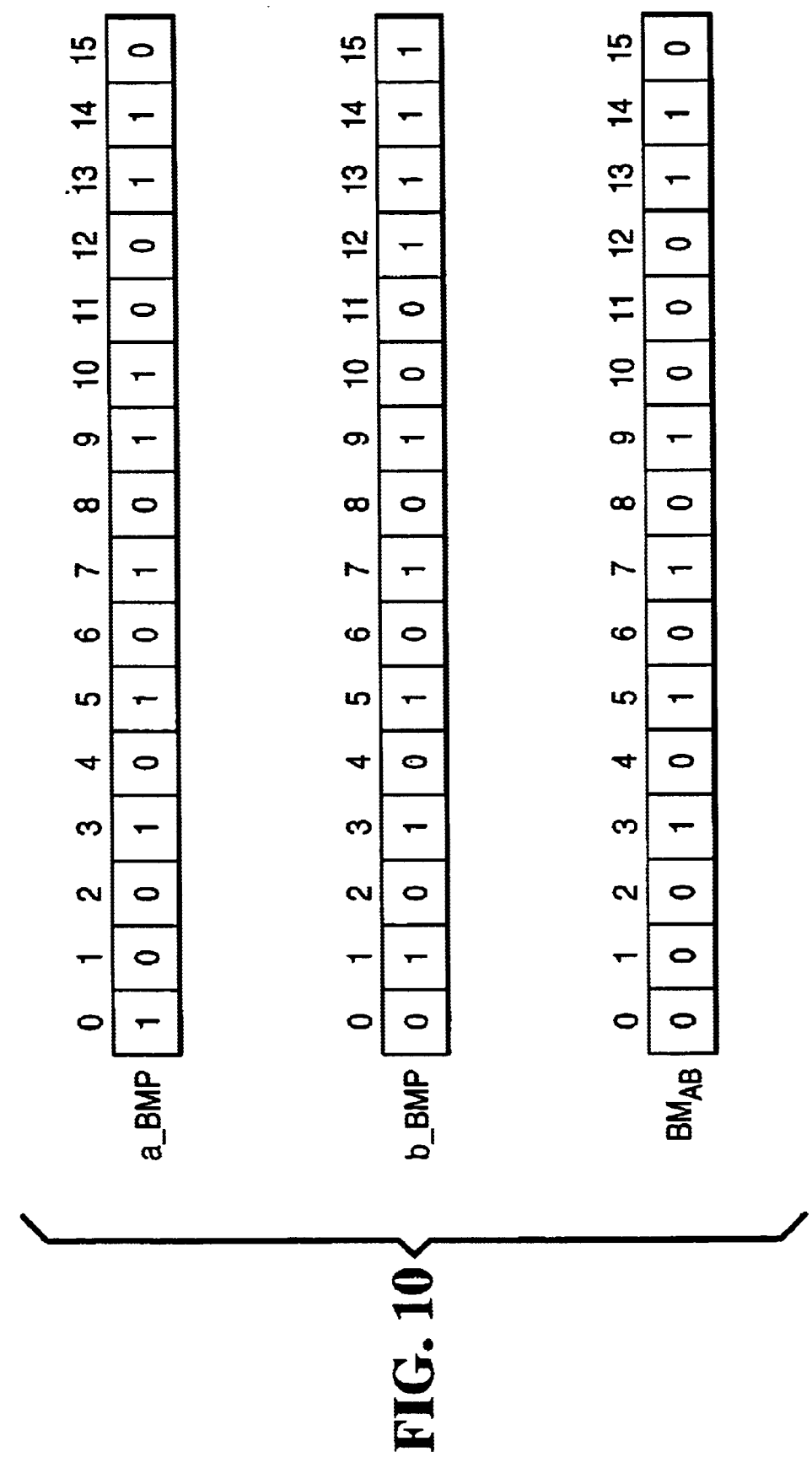
FIG. 10 is a diagram of bitmaps used to avoid duplication of join results according to one embodiment of the invention.

In one embodiment, for bitmap a_BMP, bit N is set if tuple $T_A$ is replicated at node N. Likewise, in bitmap b_BMP, bit N is set if tuple $T_B$ is replicated at node N. Bitmap $BM_{AB}$ is the bit-wise AND of a_BMP and b_BMP. Accordingly, the bits set in $BM_{AB}$ represent the nodes 10 where both $T_A$ and $T_B$ are replicated. An example of bitmaps a_BMP, b_BMP, and $BM_{AB}$, for a sixteen-node system is depicted in FIG. 10.

Using $BM_{AB}$, any of a number of algorithms may be employed to decide which node is selected. Any of the set bits in $BM_{AB}$ may identify the specific node at which the join result tuple of $T_A$ and $T_B$ is generated in the parallel spatial join index. For the nodes represented by the remaining set bits, no join operation is performed. In this manner, duplicate join results are avoided.

Spatial Join Utilizing the Parallel Spatial Join Index

In one embodiment, a spatial join between attribute c of table A and attribute x of table B may be performed using the tables $AR_A$, $AR_B$, $JI_A$, and $JI_B$. In anticipation of the spatial join operation, one or more of these data structures is copied into the memory 18, for faster processing.

In one embodiment, the spatial join operation is executed at all the nodes 10 of the parallel ORDBMS 100 in parallel. At each node, the spatial join operation is depicted in FIGS. 11A–11D, as well as in the flow diagram of FIG. 12.

Figure 11A:
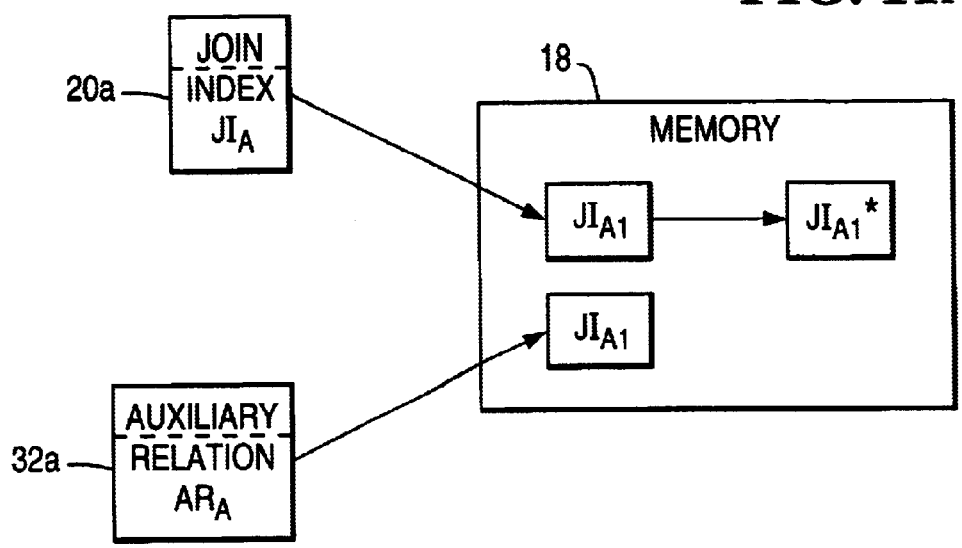
FIGS. 11A–11D are diagrams illustrating operation of the system to perform spatial joins according to one embodiment of the invention.

In FIG. 11A, a portion of the join index $JI_A$ is copied into the memory 18. The amount of memory 18 allocated to storing the portion of the join index $JI_A$ may vary, depending upon a number of factors. Given the amount of information stored in a typical database, the join index $JI_A$ may include a million or more entries. Accordingly, the spatial join operation may be performed by dividing the join index into manageable portions.

In one embodiment, the corresponding portion of the auxiliary relation $AR_A$ is similarly copied to the memory 18. A first portion of the join index $JI_A$, denoted $JI_{A1}$, and a first portion of the auxiliary relation $AR_A$, denoted $AR_{A1}$, are copied into the memory 18, as illustrated in FIG. 11A.

While in the memory 18, the join index $JI_{A1}$ is sorted according to b_id. Recall that the join index $JI_A$ is made up of a_ids and b_ids, but, originally, was sorted according to a_id. In FIG. 11A, the re-sorted $JI_{A1}$ is denoted $JI_{A1}*$. The new arrangement of $JI_{A1}*$ allows clustered access to $AR_B$.

Figure 11B:
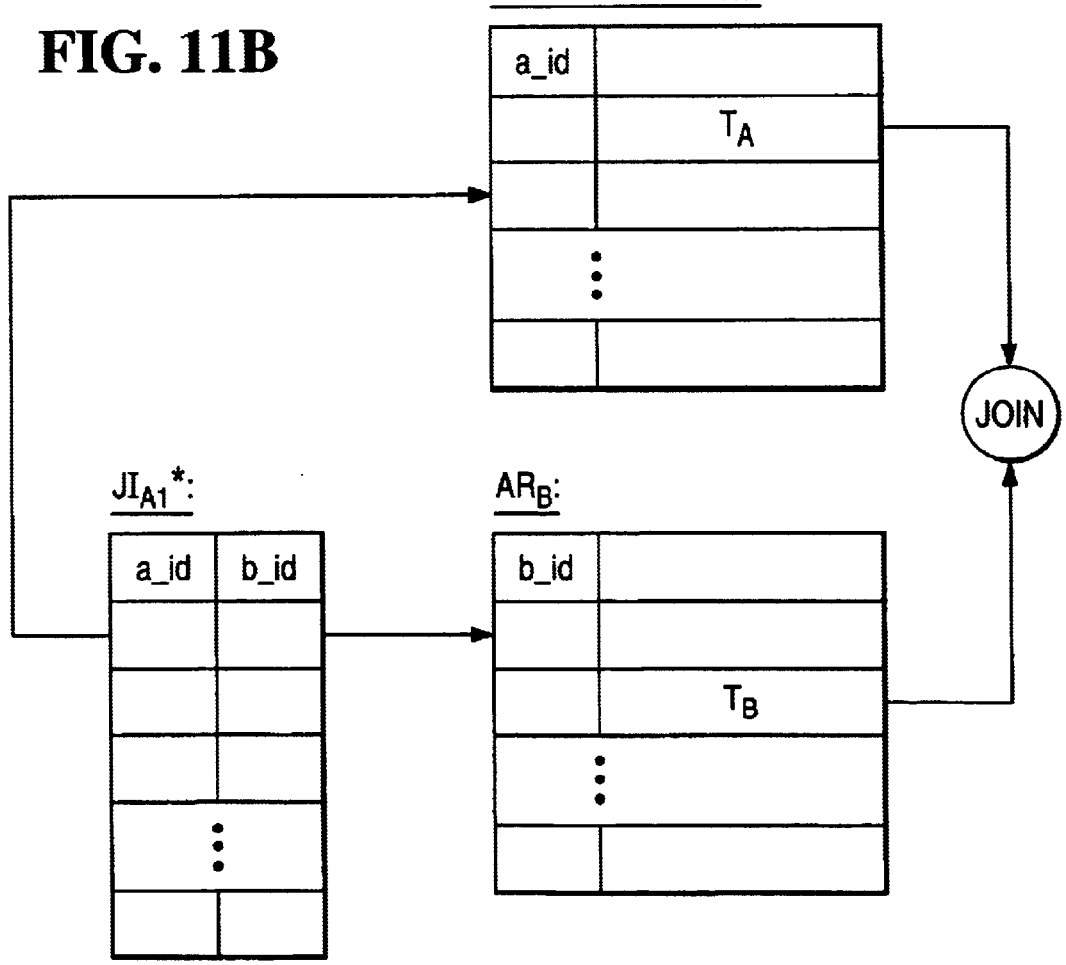

Once $JI_{A1}*$ has been created, the join operation between the spatial object attributes A.c and B.x may commence. In FIG. 11B, according to one embodiment, a first entry of the join index $JI_{A1}*$ is accessed, to retrieve the a_id and b_id record identifiers. Using the a_id entry, the associated tuple $T_A$ of $AR_{A1}$ is retrieved (in the memory 18). Likewise, using the b_id entry, the associated tuple $T_B$ of $AR_B$ is retrieved (from the stable storage 16). In one embodiment, the auxiliary relation $AR_B$ is not stored in the memory 18, but, instead, resides in the stable storage 16.

Figure 11C:
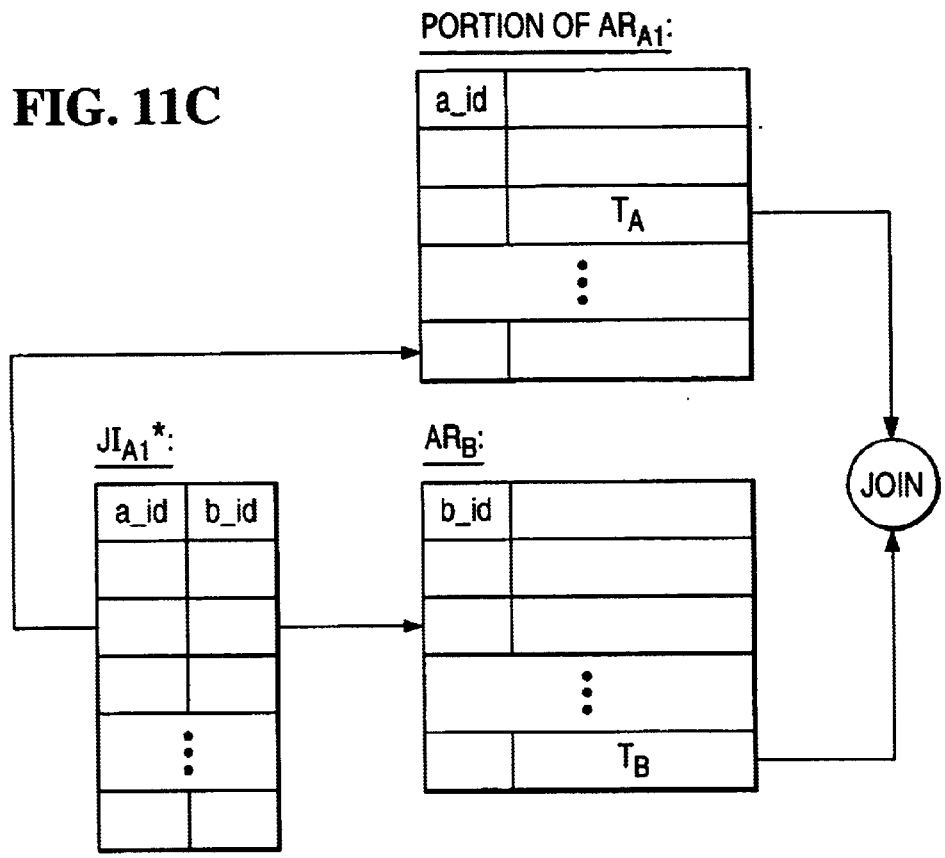
Figure 11D:
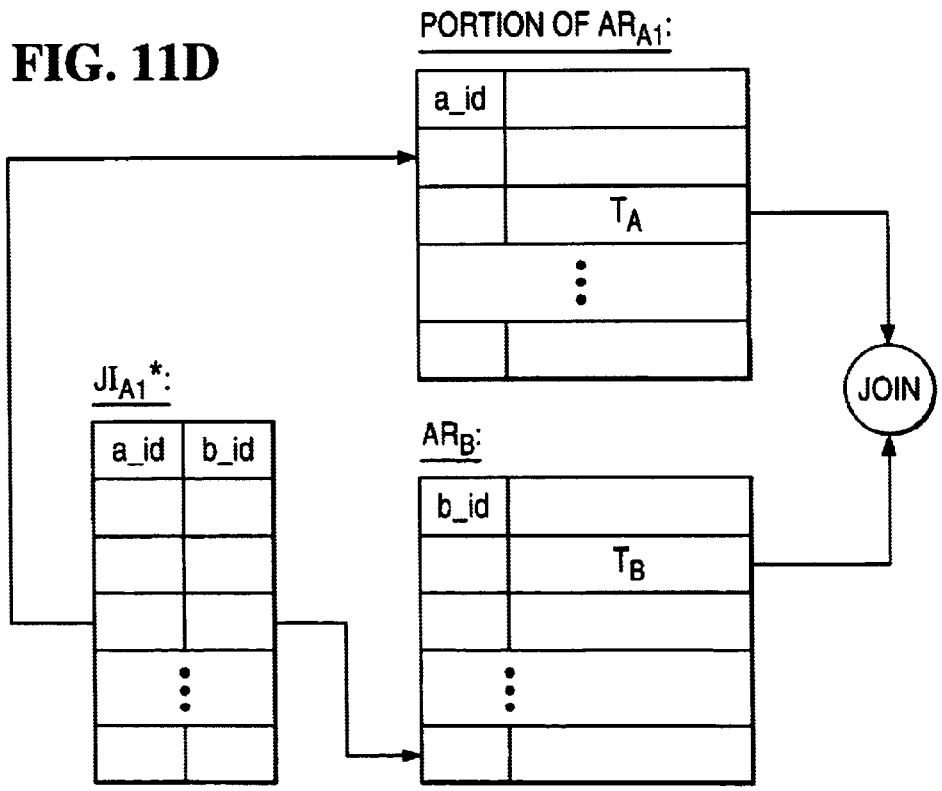

Once the tuples $T_A$ and $T_B$ are retrieved, the spatial join operation is performed. A result table is created for storing the results of each spatial join operation performed. In FIGS. 11C and 11D, subsequent retrievals of record identifiers a_id and b_id are made from the join index $JI_{A1}*$. The record identifiers point to tuples $T_A$ of $AR_{A1}$ (in memory) and tuples $T_B$ of $AR_B$ (in stable storage). The tuples $T_A$ and $T_B$ may then be joined.

Figure 12:
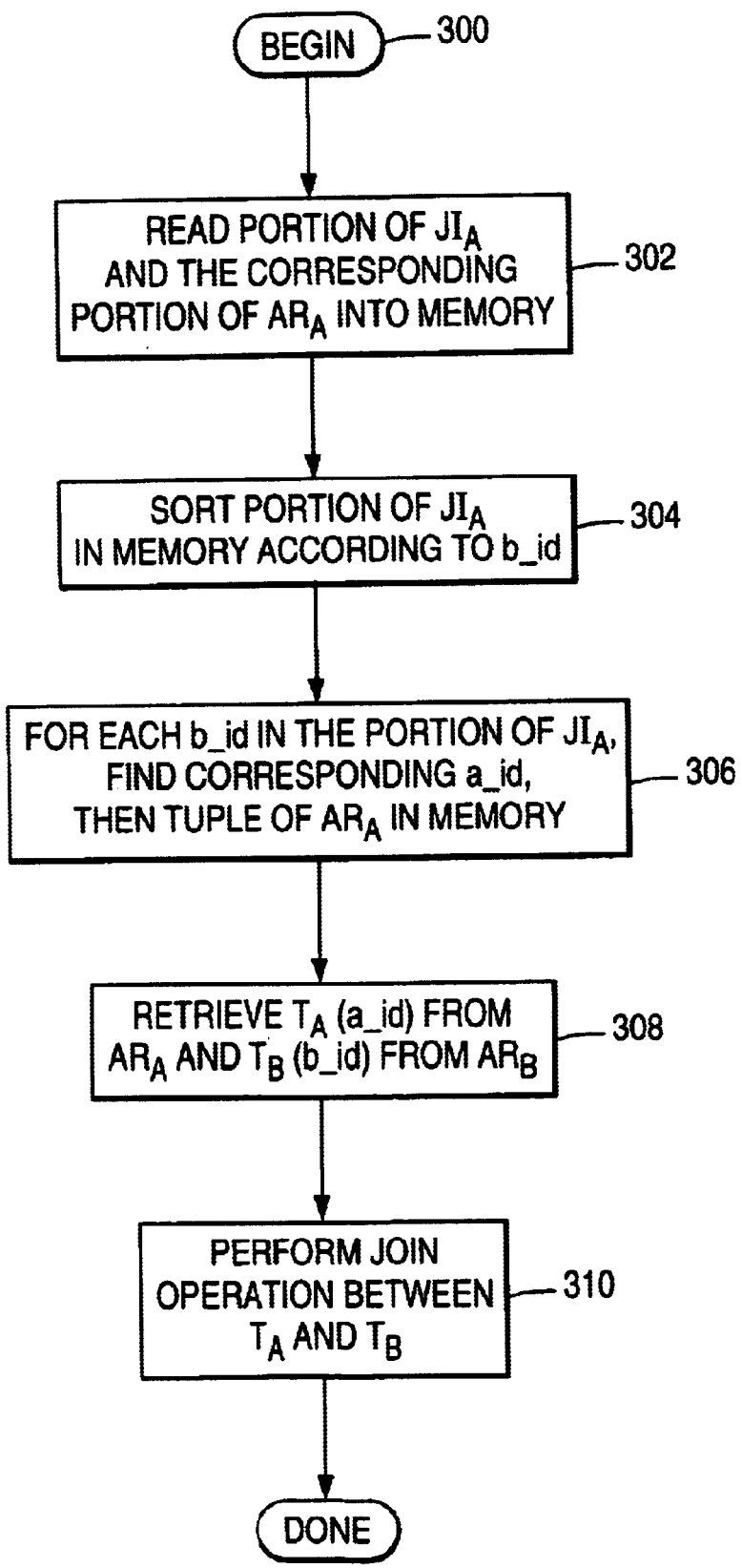
FIG. 12 is a flow diagram illustrating the parallel spatial join operation according to one embodiment of the invention.

The operations of FIGS. 11A–11D are described in the flow diagram of FIG. 12, according to one embodiment. The operations of FIG. 12 may be performed by the software program 300 (see FIG. 2). The software program 300 may be executed by one or more processors 30 of the parallel ORDBMS 100. First, a portion of the join index $JI_A$ (shown as $JI_{A1}$ in FIG. 11A) and the corresponding portion of the auxiliary relation $AR_A$ ($AR_{A1}$) are read into the memory 18 (block 302). Once in the memory 18, the portion of $JI_A$, $JI_{A1}$, is sorted according to the record identifier b_id (block 304).

Once the portion of the join index $JI_A$ is resorted, each entry of the join index is retrieved, in turn. In each entry, a b_id record identifier corresponds to a record identifier a_id. For each a_id in $JI_A$, a corresponding tuple $T_A$ in $AR_A$ may be obtained (block 306). Likewise, for each b_id in $JI_A$, a corresponding tuple $T_B$ in $AR_B$ may be obtained (block 308).

From the record identifiers a_id and b_id, tuples $T_A$ and $T_B$ may be joined according to the spatial attributes A.c and B.x, respectively (block 310). Once the tuples for one join index $JI_A$ entry are joined, subsequent entries of the join index are likewise analyzed (blocks 306 and 308) and additional tuples $T_A$ and $T_B$ are joined (block 310).

As with the join index $JI_A$, the join index $JI_B$ may similarly be used to efficiently perform a join operation between tuples $T_A$ and $T_B$ of tables A and B. For example, where the query includes a where clause condition that tuples $T_B$ of table B must satisfy, the spatial join operation, described above, may utilize $JI_B$ rather than $JI_A$.

Thus, using the auxiliary relations $AR_A$ and $AR_B$, as well as the join indices $JI_A$ and $JI_B$, parallel spatial join operations may be performed. In one embodiment, the spatial join is performed in parallel by multiple nodes 10, each performing spatial joins on tuples $T_A$ and $T_B$ of auxiliary relations $AR_A$ and $AR_B$ stored with its node.

Further, when tables A and B are updated, the join indices $JI_A$ and $JI_B$ may be maintained incrementally, in one embodiment. For example, when a tuple $T_A$ ($T_B$) is inserted into table A (table B), the spatial partitioning function SPF may be consulted to decide which nodes the tuple $T_A$ ($T_B$) should be distributed to, based upon the spatial join attribute value of the tuple. Then, as described above, a bitmap a_BMP (b_BMP) is constructed to identify the selected nodes.

For each such node, tuple $T_A$ ($T_B$), including bitmap a_BMP (b_BMP) is inserted into the auxiliary relation $AR_A$ ($AR_B$). In one embodiment, the tuple $T_A$ ($T_B$) is inserted via the R-tree index $RT_A$ ($RT_B$). Utilizing the R-tree indexing method, the bitmap attribute of the other auxiliary relation $AR_B$ ($AR_A$), and the bitmap attribute a_BMP (b_BMP) (bitmaps are used for selecting one out of multiple nodes to perform the spatial join operation), all tuples of auxiliary relation $AR_B$ ($AR_A$) and, thus, of table B (table A) that should be joined with $T_A$ ($T_B$) are obtained at the relevant nodes. Join indices $JI_A$ and $JI_B$ are subsequently updated via the B-tree indices $BT_A$ and $BT_B$. Accordingly, the generation of duplicates in the parallel spatial join index at different nodes is avoided.

Conversely, when a tuple $T_A$ ($T_B$) is to be deleted from table A (table B), its spatial join attribute value and spatial partitioning function SPF may be used to decide all the nodes 10 at which the tuple is replicated in the auxiliary relation $AR_A$ ($AR_B$). For each such node 10, tuple $T_A$ ($T_B$) is deleted from the auxiliary relation $AR_A$ ($AR_B$) via the R-tree index $RT_A$ ($RT_B$). Based on the a_id (b_id) of $T_A$ ($T_B$) (in auxiliary relation $AR_A$ ($AR_B$)), entries in the join index $JI_A$ ($JI_B$) may be deleted via the B-tree index $BT_A$ ($BT_B$). Then, based on the matching b_ids (a_ids) of that a_id (b_id) in $JI_A$ ($JI_B$), the corresponding entries in $JI_B$ ($JI_A$) may be deleted via the B-tree index $BT_B$ ($BT_A$).

Also, when updates to tuples of table A (table B) are made, if the spatial join attribute A.c (B.x) is changed, the update may be regarded as first being deleted, and then being inserted back into the table. Accordingly, the updates to the join indices for deletion and insertion of tuples, described above, may similarly be employed where tuple updates occur.

If the spatial join attribute A.c (B.x) is not changed during the update to tuple $T_A$ ($T_B$), the spatial join attribute value and spatial partitioning function SPF 40 may be used to decide all the nodes 10 at which the tuple is replicated in the auxiliary relation $AR_A$ ($AR_B$). For each such node, the changed attributes of tuple $T_A$ ($T_B$) is updated in the auxiliary relation $AR_A$ ($AR_B$), according to one embodiment. In this case, the join indices need not be changed.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software layers, routines or modules are loaded or transported to the corresponding system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) may communicate the code segments, including instructions, to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system comprising:
   receiving a portion of a join index, wherein the join index comprises first record identifiers from a first table stored in the database system and second record identifiers from a second table stored in the database system, wherein the join index is sorted according to first record identifiers from the first table;
   resorting the portion of the join index according to second record identifiers from the second table; and
   performing join operations between first and second spatial join attributes using the resorted portion of the join index.

2. The method of claim 1, further comprising:
   generating an auxiliary relation from tuples of the first table, wherein the tuples of
   the auxiliary relation are arranged according to a spatial partitioning function; and indexing the auxiliary relation according to the first spatial attribute.

3. The method of claim 2, indexing the auxiliary relation according to the first spatial attribute comprising using an R-tree index to index the auxiliary relation according to the first spatial attribute.

4. The method of claim 2, indexing the auxiliary relation according to the first spatial attribute comprising using an R-tree index to index the auxiliary relation according to the first spatial attribute.

5. The method of claim 2, further comprising:
   adding a bitmap attribute to each tuple of the auxiliary relation, wherein the bitmap attribute indicates which nodes of a plurality of nodes of the database system would receive the tuple according to the spatial partitioning function.

6. The method of claim 1, wherein the database system comprises a plurality of nodes, and wherein the receiving, resorting, and performing acts are executable: in parallel on the plurality of nodes.

7. The method of claim 6, further comprising generating an auxiliary relation from tuples of the first table, wherein the tuples of the auxiliary relation are distributed across the plurality of nodes according to a first distribution arrangement, and wherein the tuples of the first table are distributed across the plurality of nodes according to a second, different distribution arrangement.

8. The method of claim 1, wherein the first spatial join attribute is from the first table, and the second spatial join attribute is from the second table, wherein performing the join operations between the first and second spatial join attributes comprises performing a join of the first and second tables on the first and second spatial join attributes.

9. A method for use in a database system, comprising:
   generating a join index comprising two columns, wherein the first column comprises record identifiers from a first table and the second column comprises record identifiers from a second table, wherein the first table comprises first spatial object attributes and the second table comprises second spatial object attributes;
   generating a first auxiliary relation for storage in the database system, the first auxiliary relation comprising tuples from the first table, wherein the tuples are arranged in the first auxiliary relation according to a spatial partitioning function and the first spatial object attribute;
   generating a second auxiliary relation for storage in the database system, the second auxiliary relation comprising tuples from the second table, wherein the tuples are arranged in the second auxiliary relation according to the spatial partitioning function and the second spatial object attribute; and
   performing a join operation between the first and second spatial object attributes using the join index and the first and second auxiliary relations.

10. The method of claim 9, performing a join operation between the first and second spatial object attributes using the join index and the first and second auxiliary relations comprising:
    rearranging a portion of the join index according to the second record identifier; retrieving tuples of the auxiliary relation based on the rearranged portion of the join index; and joining the retrieved tuples of the first auxiliary relation with the tuples of the second auxiliary relation using the join index.

11. The method of claim 9, wherein the first spatial object attribute is from the first table, and the second spatial object attribute is from the second table, wherein performing the join operation between the first and second spatial object attributes comprises performing a join of the first and second tables on the first and second spatial object attributes.

12. A system comprising:

a processor, a storage; and instructions executable by the processor, for enabling the system to:

receive a portion of a join index into the storage, wherein the join index comprises first record identifiers from a first table and second record identifiers from a second table, wherein the join index is sorted according to first record identifiers from the first table;

resort the portion of the join index according to second record identifiers from the second table; and perform join operations between first and second spatial join attributes using the resorted portion of the join index.

13. The system of claim 12, wherein the storage comprises a memory.

14. The system of claim 12, wherein the storage comprises a memory and a hard disk drive.

15. The system of claim 12, wherein the instructions further enable the system to:

generate an auxiliary relation from tuples of the first table, wherein the tuples of the auxiliary relation are arranged according to a spatial partitioning function; and index the auxiliary relation according to the first spatial attribute.

16. An article comprising a medium storing instructions for enabling a processor-based system to:

receive a portion of a join index into a memory, wherein the join index comprises first record identifiers from a first table and second record identifiers from a second table, wherein the join index is sorted according to first record identifiers from the first table;

resort the portion of the join index according to second record identifiers from the second table; and perform join operations between first and second spatial join attributes using the resorted portion of the join index.

17. The article of claim 16, further storing instructions for enabling a processor-based system to:

generate an auxiliary relation from tuples of the first table, wherein the tuples of the auxiliary relation are arranged according to a spatial partitioning function; and index the auxiliary relation according to the first spatial attribute.

18. The article of claim 17, further storing instructions for enabling a processor-based system to:

use an R-tree index to index the auxiliary relation according to the first spatial attribute.

19. The article of claim 18, further storing instructions for enabling a processor-based system to:

add a bitmap attribute to each tuple of the auxiliary relation, wherein the bitmap attribute indicates which nodes of a plurality of nodes of the system would receive the tuple according to the spatial partitioning function.

20. The article of claim 16, wherein the system comprises a plurality of nodes, and wherein the article further stores instructions for enabling a processor-based system to generate an auxiliary relation from tuples of the first table, wherein the tuples of the auxiliary relation are distributed across the plurality of nodes according to a first distribution arrangement, and wherein the tuples of the first table are distributed across the plurality of nodes according to a second, different distribution arrangement.

21. A computer-implemented method for use in a database system including a plurality of nodes, said method comprising the steps of:

receiving a first tuple into a first node of said plurality of nodes;

copying the first tuple into a second node of the plurality of nodes based on a spatial partitioning function;

pairing second tuples in the second node with the first tuple according to a spatial join condition; and updating a join index to reflect the pairing.

22. The method of claim 21, further comprising:

performing join operations between the first tuple and the second tuples.

23. The method of claim 22, updating the join index further comprising:

storing a record identifier for the first tuple in the join index; and storing second record identifiers for the second tuples in the join index.

24. The method of claim 23, further comprising:

indexing the join index using a B-tree index on the record identifier.

25. The method of claim 21, wherein receiving the tuple comprises receiving the tuple into the first node of the plurality of nodes of a database system.

26. The method of claim 21, wherein receiving the tuple comprises receiving the tuple into a base relation in the first node, and wherein copying the tuple comprises copying the tuple into an auxiliary relation in the second node, wherein the auxiliary relation contains tuples of the base table, the base relation distributed across the nodes according to a first distribution strategy, and the auxiliary relation distributed across the nodes according to a second, different distribution strategy.

27. An article comprising a medium storing instructions for enabling a processor-based system to:

receive a first tuple into a first node of a plurality of nodes;

copy the first tuple into a second node of the plurality of nodes based on a spatial partitioning function;

pair second tuples in the second node with the first tuple according to a spatial join condition; and update a join index to reflect the pairing.

28. The article of claim 27, further storing instructions for enabling the processor-based system to:

store a record identifier for the first tuple in the join index; and store second record identifiers for the second tuples in the join index.

* * * * *